US012620576B2

(12) United States Patent
Dong et al.

(10) Patent No.: US 12,620,576 B2
(45) Date of Patent: May 5, 2026

(54) SECONDARY BATTERY AND ELECTRIC DEVICE

(71) Applicant: CONTEMPORARY AMPEREX TECHNOLOGY CO., LIMITED, Ningde (CN)

(72) Inventors: Miaomiao Dong, Ningde (CN); Lili Wu, Ningde (CN); Xuan Li, Ningde (CN); Xingbu Chen, Ningde (CN); Liang Yun, Ningde (CN); Xin Sun, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/292,955

(22) Filed: Aug. 7, 2025

(65) Prior Publication Data

US 2025/0364534 A1      Nov. 27, 2025

Related U.S. Application Data

(63) Continuation of application No. PCT/CN2024/097989, filed on Jun. 7, 2024.

(30) Foreign Application Priority Data

Apr. 10, 2023      (WO) ................ PCT/CN2023/087384

(51) Int. Cl.
    *H01M 4/36*            (2006.01)
    *H01M 4/1391*          (2010.01)
    (Continued)
(52) U.S. Cl.
    CPC ......... *H01M 4/364* (2013.01); *H01M 4/1391* (2013.01); *H01M 4/1393* (2013.01);
    (Continued)

(58) Field of Classification Search
    CPC ...... H01M 4/362; H01M 4/386; H01M 4/485; H01M 4/505
    See application file for complete search history.

(56) References Cited

U.S. PATENT DOCUMENTS 5,510,203 A *  4/1996  Hamada .............. H01M 50/258
                                                429/151
2018/0287215 A1* 10/2018  Matsui .............. H01M 10/0587
                      (Continued)

FOREIGN PATENT DOCUMENTS

CN        104795559 A        7/2015
CN        108461804 A        8/2018
                  (Continued)

OTHER PUBLICATIONS

The International Search Report received in the counterpart International Application No. PCT/CN2023/087384, dated Dec. 26, 2023, 5 pages with English translation.
                      (Continued)

*Primary Examiner* — Olatunji A Godo
(74) *Attorney, Agent, or Firm* — K&L Gates LLP

(57)                ABSTRACT
A secondary battery and an electric device are disclosed. The secondary battery includes a positive electrode sheet and a negative electrode sheet. The positive electrode sheet has a film layer comprising a positive electrode active material that contains transition metal elements, where nickel accounts for at least 85% of the total molar content of the transition metals. The energy per unit area of the positive electrode film layer on one side of the sheet ranges from 15 to 35 mWh/cm². The negative electrode sheet includes a film layer with a carbon-silicon composite active material, in which silicon nanoparticles are attached to a carbon matrix having a carbon skeleton. The combination of a high-nickel positive electrode and a carbon-silicon composite negative electrode enhances the energy density of the secondary battery.

20 Claims, 3 Drawing Sheets

(51) Int. Cl.

| | |
|---|---|
| *H01M 4/1393* | (2010.01) |
| *H01M 4/1395* | (2010.01) |
| *H01M 4/38* | (2006.01) |
| *H01M 4/485* | (2010.01) |
| *H01M 4/505* | (2010.01) |
| *H01M 4/525* | (2010.01) |
| *H01M 4/583* | (2010.01) |
| *H01M 4/587* | (2010.01) |
| *H01M 4/02* | (2006.01) |

(52) U.S. Cl.
CPC ......... *H01M 4/1395* (2013.01); *H01M 4/362* (2013.01); *H01M 4/386* (2013.01); *H01M 4/485* (2013.01); *H01M 4/505* (2013.01); *H01M 4/525* (2013.01); *H01M 4/583* (2013.01); *H01M 4/587* (2013.01); *H01M 2004/021* (2013.01); *H01M 2004/027* (2013.01); *H01M 2004/028* (2013.01); *H01M 2220/20* (2013.01)

(56) References Cited

U.S. PATENT DOCUMENTS

| | | | |
|---|---|---|---|
| 2022/0149425 A1 | 5/2022 | Park | |
| 2024/0250242 A1* | 7/2024 | Ito | H01M 4/364 |
| 2025/0233131 A1* | 7/2025 | Lee | C01B 33/22 |

FOREIGN PATENT DOCUMENTS

| | | | |
|---|---|---|---|
| CN | 111430690 A | 7/2020 |
| CN | 112952057 A | 6/2021 |
| CN | 115483393 A | 12/2022 |
| CN | 115692638 A | 2/2023 |
| EP | 3968407 A1 | 3/2022 |
| KR | 20190057950 A | 5/2019 |

OTHER PUBLICATIONS

The ISA Written Opinion received in the counterpart International Application No. PCT/CN2023/087384, dated Dec. 26, 2023, 5 pages with English translation.
The International Search Report received in the counterpart International Application No. PCT/CN2024/097989, dated Aug. 28, 2024, 6 pages with English translation.
The ISA Written Opinion received in the counterpart International Application No. PCT/CN2024/097989, dated Aug. 28, 2024, 9 pages with English translation.
Notice of Allowance (with English Machine Translation), mailed Oct. 31, 2025, for corresponding Chinese Patent Application Serial No. 202480001336.1.
Liu et al., "Improving coulombic efficiency by confinement of solid electrolyte interphase film inpores of silicon/carbon composite", J. Mater. Chem. A, 2013, 1, 14075-14079 (Abstract).
Extended European Search Report, mailed Mar. 4, 2026, for corresponding European Patent Application Serial No. 23932363.7.

* cited by examiner

5

5

SECONDARY BATTERY AND ELECTRIC DEVICE

CROSS-REFERENCE TO RELATED APPLICATION

The present application is a continuation of International Application No. PCT/CN2024/097989, filed on Jun. 7, 2025, which claims priority to Application No. PCT/CN2023/087384, entitled "SECONDARY BATTERY AND ELECTRIC DEVICE" and filed on Apr. 10, 2023, the content of which is incorporated herein by reference in its entirety.

TECHNICAL FIELD

The present application relates to the technical field of lithium batteries, and in particular, to a secondary battery with a high energy density and an electric device.

BACKGROUND

In recent years, as secondary batteries have been widely used in energy storage power systems such as hydropower, thermal power, wind power, and solar power stations, as well as in various fields such as electric tools, electric bicycles, electric motorcycles, electric vehicles, military equipment, and aerospace, there are growing demands for the performance of the secondary batteries in the market.

Lithium-ion batteries are small secondary batteries with a high mass energy density that are widely applied at present, but with the rapid development of the application field thereof, the energy density thereof is urgently needed to be further improved.

SUMMARY

The present application is made in view of the above problems, and an objective thereof is to provide a secondary battery having a high energy density.

In a first aspect of the present application, provided is a secondary battery, which includes: a positive electrode plate, where the positive electrode plate includes a positive electrode film layer, the positive electrode film layer includes a positive electrode active material containing transition metal elements, based on a total molar number of the transition metal elements in the positive electrode active material, a molar content of a nickel element is not lower than 85%, and an energy per unit area of the positive electrode film layer on a single side of the positive electrode plate is 15-35 mWh/cm², and optionally 20-35 mWh/cm²; and a negative electrode plate, where the negative electrode plate includes a negative electrode film layer, the negative electrode film layer includes a negative electrode active material containing a carbon-silicon composite material, and the carbon-silicon composite material includes carbon matrix particles having a carbon skeleton and silicon nanoparticles attached to the carbon skeleton.

The present application breaks through the limit of the theoretical capacity of the positive electrode material and the negative electrode material in the prior art by matching the positive electrode active material with a high nickel content and the carbon-silicon composite material, and achieves the preparation of the secondary battery with a high energy density.

In any embodiment, a housing weight z of the secondary battery and a bare cell weight JR of the secondary battery satisfy the following relationship: $0.01 \leq z/JR \leq 0.42$; optionally, $0.01 \leq z/JR \leq 0.1$ or $0.02 \leq z/JR \leq 0.07$.

With the above structural design, the mass of the secondary battery is further reduced, and the energy density of the battery is significantly improved.

In any embodiment, the carbon matrix particles include a three-dimensional network cross-linked pore structure, and at least a part of the silicon nanoparticles are disposed in the three-dimensional network cross-linked pore structure.

Although the theoretical specific capacity of the silicon nanoparticles is large, the expansion rate is large and the structural stability is poor during the charging and discharging process, which deteriorates the cycle performance of the battery. The carbon matrix particles of the present application have a stable three-dimensional network cross-linked porous skeleton structure, and can provide a large amount of space for the silicon nanoparticles, such that the silicon nanoparticles are not easy to agglomerate, and meanwhile, the adverse effect of volume expansion on the negative electrode plate is relieved, thereby effectively improving the cycle performance of the secondary battery.

The high nickel content can increase the specific capacity of the positive electrode plate, thereby improving the energy density of the secondary battery. However, too high nickel content may cause the increase in the mixed discharge of lithium and nickel, thereby causing the transition metal to be easily dissolved out and deposited on the negative electrode plate, and affecting the cycle performance of the battery. The three-dimensional cross-linked carbon skeleton of the carbon-silicon material of the present application can be matched with the positive electrode active material, such that the deposition of the transition metal on the silicon nanoparticles is reduced, the negative influence of the deposition of the transition metal on the negative electrode plate on the performance of the silicon-based material is reduced, and thus the cycle performance of the secondary battery is further improved.

In any embodiment, in an outer peripheral area of the carbon-silicon composite material, a mass percentage content A1 of a carbon element of the carbon-silicon composite material relative to a total mass of the carbon-silicon composite material and a mass percentage content B1 of a silicon element of the carbon-silicon composite material relative to the total mass of the carbon-silicon composite material satisfy $0.8 \leq B1/A1 \leq 2.5$, and optionally $1 \leq B1/A1 \leq 1.5$, where the outer peripheral area of the carbon-silicon composite material is an area extending from an outer surface of the carbon-silicon composite material to an interior of the carbon-silicon composite material by a distance of r/2 or less, where r represents a short diameter of the carbon-silicon composite material.

The silicon nanoparticles may undergo volume expansion during the cycle of the secondary battery. When the outer peripheral area of the carbon-silicon composite material satisfies $0.8 \leq B1/A1 \leq 2.5$, the silicon nanoparticles may be relatively uniformly attached to the carbon skeleton, the carbon matrix particles can significantly limit the volume expansion of the silicon nanoparticles, and simultaneously, the pores formed during the deposition of the silicon nanoparticles provide buffer space for the expansion of the silicon, such that the structural stability of the negative electrode active material is improved, and thus the cycle performance of the secondary battery is improved.

In any embodiment, in a central area of the carbon-silicon composite material, a mass percentage content A2 of the carbon element of the carbon-silicon composite material relative to the total mass of the carbon-silicon composite material and a mass percentage content B2 of the silicon element of the carbon-silicon composite material relative to the total mass of the carbon-silicon composite material satisfy $1.05 \leq A2/B2 \leq 50$, and optionally $1.05 \leq A2/B2 \leq 3$, where the central area of the carbon-silicon composite material is an area with a distance from a geometric center of the carbon-silicon composite material within r/2.

The central area of the carbon-silicon composite material of the present application satisfies $1.05 \leq A2/B2 \leq 50$, such that the uniformity of the silicon nanoparticles attached to the carbon skeleton can be further improved, and thus the structural stability of the negative electrode active material is further improved, and the cycle performance thereof is improved.

In any embodiment, the mass percentage content A of the carbon element of the carbon-silicon composite material relative to the total mass of the carbon-silicon composite material has a decreasing trend in a direction from the geometric center of the carbon-silicon composite material to the outer surface of the carbon-silicon composite material, while the mass percentage content B of the silicon element of the carbon-silicon composite material relative to the total mass of the carbon-silicon composite material has an increasing trend in the direction from the geometric center of the carbon-silicon composite material to the outer surface of the carbon-silicon composite material.

From the outer peripheral area to the central area, the carbon element of the carbon-silicon composite material of the present application has an increasing trend, a three-dimensional network cross-linked pore structure can be better supported, and the structural stability of the carbon skeleton is improved. From the central area to the outer peripheral area, the silicon element of the carbon-silicon composite material of the present application has an increasing trend, and the capacity of the negative electrode active material can be significantly improved. The distribution of the carbon element and the silicon element in the carbon-silicon composite material of the present application effectively improves the cycle stability of the battery.

In any embodiment, a mass percentage content of the silicon nanoparticles in the carbon-silicon composite material is greater than or equal to 40%, and optionally, 40% to 60%.

In conventional carbon-silicon composite materials, the tendency of nanoparticles to aggregate makes it difficult to effectively increase the loading of the silicon element and the capacity of the carbon-silicon composite material, thus optimizing the energy density of the battery. According to the present application, by attaching the silicon nanoparticles to the carbon matrix particles having the carbon skeleton, the content of the silicon element in the carbon-silicon composite material is effectively improved, the theoretical capacity of the carbon-silicon composite material is improved, and the consumption of the carbon-silicon composite material in the negative electrode film layer can be reduced, thereby reducing the negative electrode expansion and achieving the synchronous optimization of the energy density and cycle performance of the secondary battery.

In any embodiment, the negative electrode active material further includes a carbon-based active material.

In any embodiment, the carbon-based active material includes one or more of graphite, soft carbon, hard carbon, and porous carbon.

By adding a carbon matrix active material into the negative electrode active material, the rate capability and the cycle performance of the secondary battery can be improved.

In any embodiment, a mass percentage content $\alpha$ of the carbon-silicon composite material is 10% to 100%, and optionally, the mass percentage content of the carbon-silicon composite material is 30% to 40%, based on a total mass of the negative electrode active material.

When the content of the carbon-silicon composite material of the present application is 10% to 100%, the secondary battery has a high energy density. When the mass percentage content of the carbon-silicon composite material is 30% to 40%, the battery has both the increased energy density and improved cycle performance and rate capability.

In any embodiment, the negative electrode film layer includes a conductive agent, the conductive agent includes carbon nanotubes, and an aspect ratio of the carbon nanotubes is >2500, and/or, a mass percentage content of the carbon nanotubes is 0.1% to 0.5%, and optionally 0.3% to 0.5%, based on a total mass of the negative electrode film layer.

Because the carbon-silicon composite material has a high content in the present application, the volume expansion of the silicon nanoparticles may cause the rebound of the negative electrode film layer to a certain degree, and after repeated charging and discharging, the electric contact among all particles in the negative electrode active material may be lost. Using the carbon nanotubes with the above aspect ratio can inhibit the rebound of the negative electrode film layer and enhance the conductivity of the negative electrode plate. Moreover, in order to increase the mass energy density of the battery, the battery adopts thick-coating design, and the addition of the carbon nanotubes improves the electron transmission of the thick electrode plate through long-range conduction, thereby further optimizing the rate capability of the battery.

In any embodiment, the negative electrode plate satisfies that:

a density per unit area of the negative electrode film layer on a single side of the negative electrode plate is 4 $mg/cm^2$ to 15 $mg/cm^2$, and optionally 8 $mg/cm^2$ to 14 $mg/cm^2$, and/or, a compaction density of the negative electrode film layer on a single side of the negative electrode plate is 1.6 $g/cm^3$ to 1.8 $g/cm^3$.

The battery adopts thick-coating design to ensure the loading of the active material and further increase the mass energy density of the battery. Moreover, the electrode has a high surface density while the electrode plate has a proper compaction density, such that the rate capability of the battery can be considered while the mass energy density of the secondary battery is ensured.

In any embodiment, the positive electrode active material includes $Li_a Ni_x Co_y M_{1-x-y} O_{2-b}$, where M includes at least one of Mn, Al, B, Zr, Sr, Y, Sb, W, Ti, Mg, and Nb, and optionally, the M includes at least one of Mn, Al, B, Zr, Sr, W, Mg, and Nb; $0.2 \leq a \leq 1.2$, and $-0.2 \leq b \leq 0.2$; $0.85 \leq x \leq 1$, and $0 \leq y \leq 0.15$, and optionally, $0.92 \leq x \leq 0.98$, and $0 < y \leq 0.08$.

The increase in the content of the transition metal nickel element in the positive electrode active material can increase the mass energy density of the secondary battery.

In any embodiment, the positive electrode plate satisfies that:

a density per unit area of the positive electrode film layer on a single side of the positive electrode plate is 18 mg/cm$^2$ to 45 mg/cm$^2$, and optionally 25 mg/cm$^2$ to 45 mg/cm$^2$, and/or, a compaction density of the positive electrode film layer on a single side of the positive electrode plate is 3.3 g/cm$^3$ to 3.6 g/cm$^3$, and optionally, 3.4 g/cm$^3$ to 3.6 g/cm$^3$.

The density per unit area and the compaction density of the positive electrode film layer are within the above ranges, which can ensure that the secondary battery can have both a higher mass energy density and the improved rate capability and cycle performance. Specifically, when the density per unit area and the compaction density of the positive electrode film layer are relatively low, the positive electrode film layer contains few positive electrode active material per unit area, resulting in a decrease in the mass energy density of the secondary battery; when the density per unit area and the compaction density of the positive electrode film layer are too high, the positive electrode film layer contains more positive electrode active material per unit area, and the transition metal dissolved out from and deposited on the negative electrode is too large, thereby affecting the cycle performance of the secondary battery.

In any embodiment, a mass energy density of the secondary battery is 280 Wh/kg to 500 Wh/kg, and optionally 360 Wh/kg to 500 Wh/kg or 400 Wh/kg to 500 Wh/kg; and/or, C0 is a capacity of the secondary battery in Ah, and the C0 is 35 Ah to 200 Ah, and optionally 45 Ah to 190 Ah.

A second aspect of the present application provides an electric device, which includes the secondary battery according to the first aspect.

DESCRIPTION OF THE REFERENCE NUMERALS

Figure 1:
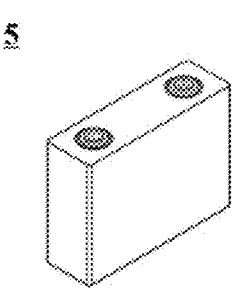
FIG. 1 is a schematic diagram of a secondary battery according to one embodiment of the present application.

1: battery pack; 2: upper case body; 3: lower case body; 4: battery module; 5: secondary battery; 51: housing; 52: electrode assembly; 53: cover plate.

DETAILED DESCRIPTION

Hereinafter, embodiments of the battery and the electric device of the present application are specifically disclosed in detail with appropriate reference to the drawings. However, unnecessarily detailed descriptions may be omitted. For example, detailed descriptions of well-known matters and repetitive descriptions of actually identical structures may be omitted. This is to avoid unnecessary lengthiness of the following descriptions and to facilitate understanding by those skilled in the art. Additionally, the drawings and the following descriptions are provided to enable those skilled in the art to fully understand the present application and are not intended to limit the subject matter recited in the claims.

The "ranges" disclosed in the present application are defined with lower and upper limits. A given range is defined by selecting a lower limit and an upper limit that delineate the boundaries of a particular range. Ranges defined in this manner may include or exclude the end values and can be combined arbitrarily, which means that any lower limit may be combined with any upper limit to form a range. For example, if ranges of 60-120 and 80-110 are listed for a particular parameter, it is understood that ranges of 60-110 and 80-120 are also anticipated. Additionally, if the minimum range values listed are 1 and 2, and the maximum range values listed are 3, 4, and 5, then the following ranges can all be anticipated: 1-3, 1-4, 1-5, 2-3, 2-4, and 2-5. In the present application, unless otherwise specified, the numerical range "a-b" indicates an abbreviated representation of any combination of real numbers between a and b, where both a and b are real numbers. For example, the numerical range "0-5" indicates that all real numbers between "0-5" are listed herein, and "0-5" is merely an abbreviated representation of a combination of these numerical values. Additionally, when stating that a parameter is an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application can be combined with one another to form new technical solutions.

Unless otherwise specified, all technical features and optional technical features of the present application can be combined with one another to form new technical solutions.

Unless otherwise specified, all steps of the present application can be performed sequentially or randomly, preferably sequentially. For example, if the method includes steps (a) and (b), it indicates that the method may include steps (a) and (b) performed sequentially or steps (b) and (a) performed sequentially. For example, if the mentioned method may further include step (c), it indicates that step (c) may be added to the method in any order; for example, the method may include steps (a), (b), and (c), or steps (a), (c), and (b), or steps (c), (a), and (b), or the like.

Unless otherwise specified, the "include" and "comprise" mentioned in the present application are open-ended or closed-ended. For example, the "include" and "comprise" may mean that other unlisted components may also be included or comprised or that only the listed components are included or comprised.

Unless otherwise specified, the term "or" in the present application is inclusive. For example, the phrase "A or B" means "A, B, or both A and B". More specifically, any one of the following conditions satisfies the condition "A or B": A is true (or present) and B is false (or absent); A is false (or absent) and B is true (or present); or both A and B are true (or present).

The high-energy lithium-ion battery is of great importance in the important strategic fields of advanced information processing terminal device, electric vehicles and the like, and thus has attracted wide attention in the market. Although the mass energy density of the lithium-ion battery which is commercialized at present reaches 150-200 Wh/kg, the mass energy density of the battery is difficult to further increase to satisfy the market demands due to the limitation of the theoretical capacity of the positive and negative electrode materials.

[Secondary Battery]

Based on this, the present application proposes a secondary battery to further increase the mass energy density of the secondary battery.

In some embodiments, the secondary battery includes: a positive electrode plate and a negative electrode plate, where the positive electrode plate includes a positive electrode film layer, the positive electrode film layer includes a positive electrode active material containing transition metal elements, based on a total molar number of the transition metal elements in the positive electrode active material, a molar content of a nickel element is not lower than 85%, and an energy per unit area of the positive electrode film layer on a single side of the positive electrode plate is 15-35 mWh/cm², and optionally 20-35 mWh/cm²;

the negative electrode plate includes a negative electrode film layer, the negative electrode film layer includes a negative electrode active material containing a carbon-silicon composite material, and the carbon-silicon composite material includes carbon matrix particles having a carbon skeleton and silicon nanoparticles attached to the carbon skeleton.

In some embodiments, the carbon skeleton is of a solid structure, and the silicon nanoparticles are attached to at least a part of the surface of the carbon skeleton.

In some embodiments, the carbon skeleton is of a porous skeleton structure, and the silicon nanoparticles are attached to at least a part of the surface of the carbon skeleton and the pores of the carbon skeleton, and the silicon nanoparticles may fill all or part of the pores of the carbon skeleton.

In some embodiments, the carbon skeleton is of a porous skeleton structure, in which the pore represents a concave structure that is recessed relative to the outer surface of the negative electrode active material and is recessed into the interior of the negative electrode active material, or a through hole that penetrates the negative electrode active material. The composition of the pore structure includes pore diameter, pore length, pore diameter distribution, and the like. The pore diameter of the carbon skeleton having pores in the carbon matrix particles includes micropores, mesopores, and macropores. Micropores refer to pores having a diameter of less than about 2 nanometers. Mesopores refer to pores having a diameter of about 2 nanometers to about 5 nanometers. Macropores refer to pores having a diameter of greater than 50 nanometers.

The characteristics of the positive electrode plate and the negative electrode plate may be observed and tested by taking the negative electrode plate and/or the positive electrode plate under a scanning electron microscope and/or an energy spectrometer after the battery is disassembled. As an example, the carbon skeleton of the carbon-silicon composite material may be tested using devices and methods known in the art. For example, the test may be performed by using a scanning electron microscope (e.g., ZEISS Sigma 300). As an example, the following steps may be followed: a negative electrode plate is taken out after a battery is disassembled, the negative electrode plate is then cut into a sample to be tested of a certain dimension (such as 6 mm×6 mm), and the sample to be tested is clamped by using two conductive and thermally conductive thin foils (such as copper foils); the sample to be tested and the copper foils are stuck and fixed by using an adhesive (such as double-sided adhesive), and then pressed with a flat iron block of a certain mass (such as 400 g) for a certain time (such as 1 h), and then the edges are trimmed by using scissors, and the sample to be tested is stuck onto a sample stage with a conductive adhesive. Then, the sample stage is placed into a sample holder and locked in place, an argon ion cross-section polisher (such as IB-19500CP) is turned on and evacuated (e.g., 10 Pa to 4 Pa), and the argon flow (e.g., 0.15 MPa), voltage (e.g., 8 KV) and polishing time (e.g., 2 h) are set; the sample stage is adjusted to a swing mode, and the polishing is started; after the polishing is completed, an image of the ion-polished cross-sectional morphology of the sample to be tested is obtained by using a scanning electron microscope (such as ZEISS Sigma 300). The acquired scanning electron microscope image is analyzed by using an energy spectrometer to obtain the distribution statistics of the carbon and silicon elements. Similarly, the positive electrode plate is scanned and subjected to elemental analysis, and the composition thereof can be analyzed.

In some embodiments, the silicon nanoparticles have a particle size on the nanometer scale, which makes it easier for the silicon nanoparticles to be uniformly attached to the carbon skeleton when the silicon nanoparticles are deposited on the pore structure.

In some embodiments, the carbon matrix particles and the silicon nanoparticles are combined to form the carbon-silicon composite material, which may be geometrically irregular particles. In this case, the particle size may be characterized using a three-axis diameter characterization method, specifically as follows: the long diameter 1 and the short diameter r are determined on a plane projection diagram of the carbon-silicon composite material, and the thickness h of the carbon-silicon composite material is determined in the vertical direction of the projection plane. It can also be interpreted as placing the carbon-silicon composite material in a rectangular parallelepiped tangential thereto, where the long side of the rectangular parallelepiped is 1, the short side is r, and the thickness is h, so as to reflect the actual dimension of the carbon-silicon composite material.

In some embodiments, the energy per unit area of the positive electrode film layer on a single side of the positive electrode plate may be 15 mWh/cm², 16 mWh/cm², 17 mWh/cm², 18 mWh/cm², 19 mWh/cm², 20 mWh/cm², 21 mWh/cm², 22 mWh/cm², 23 mWh/cm², 25 mWh/cm², 27 mWh/cm², 29 mWh/cm², 31 mWh/cm², 33 mWh/cm², 35 mWh/cm², or a numerical value in a range formed by any two of the foregoing values.

The energy per unit area of the positive electrode film layer on a single side of the positive electrode plate may be measured using methods and devices commonly used in the art. As an example, for the energy per unit area of the positive electrode film layer on a single side of the positive electrode plate, the following steps may be followed: a battery cell is left to stand at a certain temperature (e.g., 25° C.) for a certain time (e.g., 2 h) to ensure that the temperature of the battery cell is room temperature (e.g., 25° C.). After the battery cell is charged at a certain rate (e.g., 0.33C) to a charge cut-off voltage at a certain temperature (e.g., 25° C.), and constant-voltage charging is continued at the charge cut-off voltage until the current reaches 0.05C, at which point charging is terminated (where C represents a rated capacity of the battery cell). After the battery cell is left to stand at a certain temperature (e.g., 25° C.) for a certain time (e.g., 1 h), the battery cell is discharged at a certain rate (0.33C) to a discharge cut-off voltage at a certain temperature (e.g., 25° C.), and the total discharge energy is recorded as E0. The battery is disassembled, a positive electrode plate is taken out, and the length and the width of the film on the positive electrode plate are measured by using a graduated scale to obtain the area value S0 of the positive electrode film. When both surfaces of the positive electrode plate are coated, the energy per unit area of the positive electrode film layer is =E0/(2× S0); when one surface of the positive electrode film layer is coated, the energy per unit area of the positive electrode plate is =E0/S0.

In the above test method, the charge cut-off voltage is 4.25V, the discharge cut-off voltage is 2.0V, and the charging rate and the discharging rate are both 0.33C.

The present application breaks through the limit of the theoretical capacity of the positive electrode material and the negative electrode material in the prior art by matching the positive electrode active material with a high nickel content and the carbon-silicon composite material, and achieves the preparation of the secondary battery with a high energy density.

The bare cell weight and the housing weight of the secondary battery may be tested using devices and methods known in the art. For example, the test may be performed by using an electronic balance. As an example, the following steps may be followed: firstly, the bare cell is separated from the shell of the battery; secondly, in order to remove the electrolytic solution free in the bare cell, the bare cell can be soaked in a dimethyl carbonate (DMC) solvent for 4 h, and then the bare cell is transferred to a blast air oven at 60° C. for drying for 4 h to obtain a dried bare cell; and thirdly, the shell of the battery and the bare cell are separately placed on an electronic balance for weighing to obtain the housing weight of the secondary battery and the bare cell weight.

The mass percentage content of the carbon-silicon composite material may be tested using devices and methods known in the art. For example, it can be obtained by measuring the mass and the silicon content of the negative electrode active material in the negative electrode film layer and the silicon content of the carbon-silicon composite material and converting them.

As an example, the following steps may be followed:

(1) Two batteries with the same design are taken out, and after the first battery is disassembled, a negative electrode plate is taken out. The negative electrode plate is soaked in a dimethyl carbonate (DMC) solvent for 4 h, and then calcined in a box-type resistance furnace at a high temperature of 400° C. for 2 h to remove a binder to obtain a negative electrode active material, which is weighed as M0. The negative electrode active material sample is digested with aqua regia and hydrofluoric acid, and the completely digested solution is subjected to an ICP test to obtain a mass ratio of the silicon element in the negative electrode active material, which is recorded as X0. The mass M1 of silicon in the negative electrode active material may be obtained by multiplying M0 by X0;

(2) After the other battery is disassembled, a negative electrode plate is taken out. The negative electrode plate is soaked in a dimethyl carbonate (DMC) solvent for 4 h, and then calcined in a box-type resistance furnace at a high temperature of 400° C. for 2 h to remove auxiliary materials such as the binder in the electrode plate to obtain a negative electrode active material; a carbon-silicon composite material is separated from the negative electrode active material by using size-classification screening or other screening methods known in the art, the separated carbon-silicon composite material is then completely digested with aqua regia and hydrofluoric acid, and the digested solution is subjected to an ICP test to obtain the mass content ratio (X1) of the silicon element in the carbon-silicon composite material;

(3) From the above calculation results, it is possible to obtain that: the mass M2 of the carbon-silicon composite material in the secondary battery is =M1/X1, and the mass percentage content of the carbon-silicon composite material is =M2/M0×100%.

[Negative Electrode Active Material]

In some embodiments, the matrix particles include a three-dimensional network cross-linked pore structure, and at least a part of the silicon nanoparticles are disposed in the three-dimensional network cross-linked pore structure.

In the present application, the "three-dimensional network cross-linked pore structure" refers to a structure in which two or more pores are intercommunicated or staggered and share a pore volume with each other in a pore structure formed by carbon matrix particles.

Although the theoretical specific capacity of the silicon nanoparticles is large, the expansion rate is large and the structural stability is poor during the charging and discharging process, which deteriorates the cycle performance of the battery. The carbon matrix particles of the present application have a stable three-dimensional network cross-linked porous skeleton structure, and can provide a large amount of space for the silicon nanoparticles, such that the silicon nanoparticles are not easy to agglomerate, and meanwhile, the adverse effect of volume expansion on the negative electrode plate is relieved, thereby effectively improving the cycle performance of the secondary battery.

The high nickel content can increase the specific capacity of the positive electrode plate, thereby improving the mass energy density of the secondary battery. However, too high nickel content may cause the increase in the mixed discharge of lithium and nickel, thereby causing the transition metal to be easily dissolved out and deposited on the negative electrode plate, and affecting the cycle performance of the battery. The three-dimensional cross-linked carbon skeleton of the carbon-silicon material of the present application can be matched with the positive electrode active material, such that the deposition of the transition metal on the silicon nanoparticles is reduced, the negative influence of the deposition of the transition metal on the negative electrode plate on the performance of the silicon-based material is reduced, and thus the cycle performance of the secondary battery is further improved.

In some embodiments, in an outer peripheral area of the carbon-silicon composite material, a mass percentage content A1 of a carbon element of the carbon-silicon composite material relative to a total mass of the carbon-silicon composite material and a mass percentage content B1 of a silicon element of the carbon-silicon composite material relative to the total mass of the carbon-silicon composite material satisfy $0.8 \leq B1/A1 \leq 2.5$, and optionally $1 \leq B1/A1 \leq 1.5$, where the outer peripheral area of the carbon-silicon composite material is an area extending from an outer surface of the carbon-silicon composite material to an interior of the carbon-silicon composite material by a distance of r/2 or less, where r represents a short diameter of the carbon-silicon composite material.

The carbon-silicon composite material of the present application includes an outer peripheral area, where the outer peripheral area can be understood as an area extending from the outer surface of the carbon-silicon composite material to the interior of the carbon-silicon composite material by a distance of r/2 or less.

In some embodiments, B1/A1 may be 0.8, 0.9, 1, 1.1, 1.2, 1.3, 1.4, 1.5, 1.6, 1.8, 1.9, 2.0, 2.1, 2.2, 2.3, 2.4, 2.5, or a range consisting of any two of the foregoing numerical values.

The silicon nanoparticles may undergo volume expansion during the cycle of the secondary battery. When the outer peripheral area of the carbon-silicon composite material satisfies $0.8 \le B1/A1 \le 2.5$, the silicon nanoparticles may be relatively uniformly attached to the carbon skeleton, the carbon matrix particles can significantly limit the volume expansion of the silicon nanoparticles, and simultaneously, the pores formed during the deposition of the silicon nanoparticles provide buffer space for the expansion of the silicon, such that the structural stability of the negative electrode active material is improved, and thus the cycle performance of the secondary battery is improved.

In some embodiments, in a central area of the carbon-silicon composite material, a mass percentage content $A2$ of the carbon element of the carbon-silicon composite material relative to the total mass of the carbon-silicon composite material and a mass percentage content $B2$ of the silicon element of the carbon-silicon composite material relative to the total mass of the carbon-silicon composite material satisfy $1.05 \le A2/B2 \le 50$, and optionally $1.05 \le A2/B2 \le 3$, where the central area of the carbon-silicon composite material is an area with a distance from a geometric center of the carbon-silicon composite material within r/2.

The carbon-silicon composite material of the present application includes a central area, where the central area can be understood as an area with a distance from the geometric center of the carbon-silicon composite within r/2.

In some embodiments, A2/B2 may be 1.05, 1.1, 1.15, 1.20, 1.25, 1.30, 1.40, 1.50, 1.60, 1.70, 1.80, 1.90, 2.0, 2.2, 2.5, 2.8, 3.0, 5, 10, 15, 20, 25, 30, 35, 40, 45, 50, or a range consisting of any two of the foregoing numerical values.

The mass percentage contents of the silicon element and the carbon element of the carbon-silicon composite material relative to the total mass of the carbon-silicon composite material may be measured using methods and devices known in the art. For example, the mass percentage content of the silicon element may be measured by emission spectroscopy. As an example, the following steps may be followed: after the battery is disassembled, the negative electrode plate is taken out, the binder is removed, and the carbon-silicon composite material is taken as a sample; the sample is digested by using a strong acid solution (such as aqua regia and hydrofluoric acid HF), and the solution digested for 15 min and the completely digested solution are subjected to an ICP test, where the silicon content in the solution digested for 15 min is the silicon content of "the outer peripheral area of the carbon-silicon composite material", and the difference value between the silicon content in the completely digested solution and the silicon content in the solution digested for 15 min is the silicon content of "the central area of the carbon-silicon composite". For example, the mass percentage content of the carbon element may be tested by the infrared absorption method for carbon-sulfur content analysis according to the GB/T 20123-2006 test standard. As an example, the following steps may be followed: after the battery is disassembled, the negative electrode plate is taken out, the binder is removed, and the carbon-silicon composite material is taken as a sample; the carbon content at 20 min is tested as the carbon content of "the outer peripheral area of the carbon-silicon composite", and the difference value between the carbon content at 20 min and the carbon content at the end of testing is tested as the carbon content of "the central area of the carbon-silicon composite material".

The central area of the carbon-silicon composite material of the present application satisfies $1.05 \le A2/B2 \le 50$, such that the uniformity of the silicon nanoparticles attached to the carbon skeleton can be further improved, and thus the structural stability of the negative electrode active material is further improved, and the mass energy density of the secondary battery can be improved while the long-cycle performance is considered.

In some embodiments, the mass percentage content A of the carbon element of the carbon-silicon composite material relative to the total mass of the carbon-silicon composite material has a decreasing trend in a direction from the geometric center of the carbon-silicon composite material to the outer surface of the carbon-silicon composite material, while the mass percentage content B of the silicon element of the carbon-silicon composite material relative to the total mass of the carbon-silicon composite material has an increasing trend in the direction from the geometric center of the carbon-silicon composite material to the outer surface of the carbon-silicon composite material.

In some embodiments, due to the example that the carbon-silicon composite material may be irregularly shaped, the geometric center of the carbon-silicon composite material may be equivalent to the geometric center of a rectangular parallelepiped tangential thereto.

From the outer peripheral area to the central area, the carbon element of the carbon-silicon composite material of the present application has an increasing trend, a three-dimensional network cross-linked pore structure can be better supported, and the structural stability of the carbon skeleton is improved. From the central area to the outer peripheral area, the silicon element of the carbon-silicon composite material of the present application has an increasing trend, and the capacity of the negative electrode active material can be significantly improved. The distribution of the carbon element and the silicon element in the carbon-silicon composite material of the present application effectively improves the cycle stability of the battery.

In some embodiments, a mass percentage content of the silicon nanoparticles in the carbon-silicon composite material is greater than or equal to 40%, and optionally, 40% to 60%.

In some embodiments, a mass percentage content of the nanoparticles in the carbon-silicon composite material may be 40%, 45%, 50%, 60%, 75%, 80%, or a numerical value in a range formed by any two of the foregoing values.

In conventional carbon-silicon composite materials, the tendency of nanoparticles to aggregate makes it difficult to effectively increase the loading of the silicon element and the capacity of the carbon-silicon composite material, thus optimizing the mass energy density of the battery. According to the present application, by attaching the silicon nanoparticles to the carbon matrix particles having the carbon skeleton, the content of the silicon element in the carbon-silicon composite material is effectively improved, the theoretical capacity of the carbon-silicon composite material is improved, and the consumption of the carbon-silicon composite material in the negative electrode film layer can be reduced, thereby reducing the negative electrode expansion and achieving the synchronous optimization of the energy density and cycle performance of the secondary battery.

In some embodiments, the negative electrode active material further includes a carbon-based active material.

In some embodiments, the carbon-based active material includes one or more of graphite, soft carbon, hard carbon, and porous carbon.

In some embodiments, the carbon-based active material is selected from graphite and hard carbon. In some embodiments, the carbon-based active material is selected from graphite.

By adding a carbon matrix active material into the negative electrode active material, the rate capability and the cycle performance of the secondary battery can be improved.

In some embodiments, the mass percentage content $\alpha$ of the carbon-silicon composite material is 10% to 100%, based on the total mass of the negative electrode active material, and optionally, the mass percentage content of the carbon-silicon composite material is 30% to 40%.

In some embodiments, the mass percentage content $\alpha$ of the carbon-silicon composite material may be 10%, 20%, 25%, 30%, 35%, 40%, 50%, 60%, 70%, 80%, 90%, 100%, or a numerical value in a range formed by any two of the foregoing values, based on the total mass of the negative electrode active material.

When the content of the carbon-silicon composite material of the present application is 10% to 100%, the secondary battery has a high energy density. When the mass percentage content of the carbon-silicon composite material is 30% to 40%, the battery has both the increased energy density and improved cycle performance and rate capability.

In some embodiments, the negative electrode film layer includes a conductive agent, the conductive agent includes carbon nanotubes, and an aspect ratio of the carbon nanotubes is >2500, and/or, a mass percentage content of the carbon nanotubes is 0.1% to 0.5%, and optionally 0.3% to 0.5%, based on the total mass of the negative electrode film layer.

In some embodiments, the mass percentage content of the carbon nanotubes may be 0.1%, 0.15%, 0.2%, 0.25%, 0.3%, 0.35%, 0.4%, 0.45%, 0.5%, or a numerical value in a range formed by any two of the foregoing values.

In some embodiments, the conductive agent may further include at least one of superconducting carbon, acetylene black, carbon black, Ketjen black, carbon dots, graphene, and carbon nanofibers.

Because the carbon-silicon composite material has a high content in the present application, the volume expansion of the silicon nanoparticles may cause the rebound of the negative electrode film layer to a certain degree, and after repeated charging and discharging, the electric contact among all particles in the negative electrode active material may be lost. Using the carbon nanotubes with the above aspect ratio can inhibit the rebound of the negative electrode film layer and enhance the conductivity of the negative electrode plate. Moreover, in order to increase the mass energy density of the battery, the battery adopts thick-coating design, and the addition of the carbon nanotubes improves the electron transmission of the thick electrode plate through long-range conduction, thereby further optimizing the dynamics performance of the battery.

In some embodiments, the negative electrode plate satisfies that: a density per unit area of the negative electrode film layer on a single side of the negative electrode plate is 4 mg/cm$^2$ to 15 mg/cm$^2$, and optionally 8 mg/cm$^2$ to 14 mg/cm$^2$, and/or, a compaction density of the negative electrode film layer on a single side of the negative electrode plate is 1.6 g/cm$^3$ to 1.8 g/cm$^3$.

In some embodiments, the density per unit area of the negative electrode film layer on a single side of the negative electrode plate may be 4 mg/cm$^2$, 5 mg/cm$^2$, 6 mg/cm$^2$, 7 mg/cm$^2$, 8 mg/cm$^2$, 9 mg/cm$^2$, 10 mg/cm$^2$, 11 mg/cm$^2$, 12 mg/cm$^2$, 13 mg/cm$^2$, 14 mg/cm$^2$, 15 mg/cm$^2$, or a numerical value in a range formed by any two of the foregoing values.

In some embodiments, the compaction density of the negative electrode film layer on a single side of the negative electrode plate may be 1.6 g/cm$^3$, 1.65 g/cm$^3$, 1.7 g/cm$^3$, 1.75 g/cm$^3$, 1.8 g/cm$^3$, or a numerical value in a range formed by any two of the foregoing values.

The battery adopts thick-coating design to ensure the loading of the active material and further improve the mass energy density of the battery and the energy per unit area of the positive electrode film layer. Moreover, the electrode has a high surface density while the electrode plate has a proper compaction density, such that the dynamics performance of the battery can be considered while the mass energy density of the secondary battery is ensured.

[Negative Electrode Plate]

The negative electrode plate includes a negative electrode current collector and a negative electrode film layer disposed on at least one surface of the negative electrode current collector, and the negative electrode film layer includes the negative electrode active material of the present application.

In some embodiments, a metal foil or a composite current collector may be used as the negative electrode current collector. For example, as the metal foil, a copper foil may be used. The composite current collector may include a polymer material substrate and a metal layer formed on at least one surface of the polymer material substrate. The composite current collector can be formed by forming a metal material (copper, copper alloy, nickel, nickel alloy, titanium, titanium alloy, silver, silver alloy, etc.) on a polymer material substrate (such as polypropylene (PP), polyethylene terephthalate (PET), polybutylene terephthalate (PBT), polystyrene (PS), and polyethylene (PE)).

In some embodiments, the negative electrode film layer further optionally includes a binder. The binder may be selected from at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally includes other auxiliary agents, such as a thickener (e.g., sodium carboxymethylcellulose (CMC-Na)).

In some embodiments, the negative electrode plate can be prepared in the following manner: dispersing the components described above for preparing the negative electrode plate, such as the negative electrode active material, the conductive agent, the binder, and any other components, in a solvent (such as deionized water) to form a negative electrode slurry; and coating the negative electrode current collector with the negative electrode slurry, and performing drying, cold pressing, and other processes, such that the negative electrode plate can be obtained.

[Positive Electrode Active Material]

In some embodiments, the positive electrode active material includes $Li_aNi_xCo_yM_{1-x-y}O_{2-b}$, where M includes at least one of Mn, Al, B, Zr, Sr, Y, Sb, W, Ti, Mg, and Nb, and optionally, the M includes at least one of Mn, Al, B, Zr, Sr, W, Mg, and Nb; $0.2 \leq a \leq 1.2$, and $-0.2 \leq b \leq 0.2$; $0.85 \leq x \leq 1$, and $0 \leq y \leq 0.15$, and optionally, $0.92 \leq x \leq 0.98$, and $0 < y \leq 0.08$.

In some embodiments, a may be 0.2, 0.4, 0.6, 0.8, 1.0, 1.2, or a numerical value in a range formed by any two of the foregoing values.

In some embodiments, b may be −0.2, −0.1, 0, 0.1, 0.2, or a numerical value in a range formed by any two of the foregoing values.

In some embodiments, x may be 0.85, 0.87, 0.89, 0.91, 0.93, 0.95, 0.97, or a numerical value in a range formed by any two of the foregoing values, and y may be 0, 0.03, 0.05, 0.07, 0.09, 0.11, 0.13, or a numerical value in a range formed by any two of the foregoing values.

The increase in the content of the transition metal nickel element in the positive electrode active material can increase the mass energy density of the secondary battery.

In some embodiments, M includes Mn. In some embodiments, M includes Al. In some embodiments, M includes B. In some embodiments, M includes Zr. In some embodiments, M includes Sr. In some embodiments, M includes W. In some embodiments, M includes Mg. In some embodiments, M includes Nb.

The ternary positive electrode active material has more excellent electrochemical properties than the commonly used binary positive electrode active material. Specifically, the M element is doped in the positive electrode active material to optimize the particle size and the particle size distribution, and improve the electron and lithium ion transport performance of the positive electrode active material, thereby improving the mass energy density of the secondary battery.

In some embodiments, the positive electrode plate satisfies that:

a density per unit area of the positive electrode film layer on a single side of the positive electrode plate is 19 mg/cm$^2$ to 45 mg/cm$^2$, and optionally 25 mg/cm$^2$ to 45 mg/cm$^2$, and/or, a compaction density of the positive electrode film layer on a single side of the positive electrode plate is 3.3 g/cm$^3$ to 3.6 g/cm$^3$, and optionally, 3.4 g/cm$^3$ to 3.6 g/cm$^3$.

In some embodiments, the density per unit area of the positive electrode film layer on a single side of the positive electrode plate may be 19 mg/cm$^2$, 20 mg/cm$^2$, 22 mg/cm$^2$, 24 mg/cm$^2$, 26 mg/cm$^2$, 28 mg/cm$^2$, 30 mg/cm$^2$, 32 mg/cm$^2$, 34 mg/cm$^2$, 36 mg/cm$^2$, 38 mg/cm$^2$, 40 mg/cm$^2$, 42 mg/cm$^2$, 44 mg/cm$^2$, or a numerical value in a range formed by any two of the foregoing values.

In some embodiments, the compaction density of the positive electrode film layer on a single side of the positive electrode plate may be 3.45 g/cm$^3$, 3.5 g/cm$^3$, 3.55 g/cm$^3$, or a numerical value in a range formed by any two of the foregoing values.

The density per unit area and the compaction density of the positive electrode film layer on a single side of the positive electrode plate or the negative electrode film layer on a single side of the negative electrode plate may be measured using methods and devices commonly used in the art. As an example, for the compaction density of the film layer on a single side of the electrode plate, the following steps may be followed: when one surface of the electrode plate is coated, the compaction density of the film layer on the single side of the electrode plate is $=m/(V1−V2)$, and when both surfaces of the electrode plate are coated, the compaction density of the film layer on the single side of the electrode plate is $=m/[2×(V1−V2)]$, where m represents the weight of the film layer, V1 represents the volume of the electrode plate, and V2 represents the volume of the current collector. m may be obtained by subtracting the weight of the current collector from the weight of the electrode plate, the product of the surface area of the electrode plate and the thickness of the electrode plate is the volume V1 of the electrode plate, the product of the surface area of the electrode plate and the thickness of the current collector is V2, and the thickness of the current collector and the thickness of the electrode plate are obtained by measuring the thickness of thetab-free foil area using a micrometer. As an example, for the density per unit area of the film layer on a single side of the electrode plate, the following steps may be followed: when one surface of the electrode plate is coated, the density per unit area of the film layer on the single side of the electrode plate is $=m/S$, and when both surfaces of the electrode plate are coated, the density per unit area of the film layer on the single side of the electrode plate is $=m/(2×S)$, where m represents the weight of the film layer; S represents the area of the film layer; m may be obtained by subtracting the weight of the current collector from the weight of the electrode plate, and the length and the width of the film layer may be obtained by measuring using a graduated scale.

The density per unit area and the compaction density of the positive electrode film layer are within the above ranges, which can ensure that the secondary battery can have a higher mass energy density and a higher energy per unit area of the positive electrode film layer, and meanwhile, have the improved dynamics performance and cycle performance. Specifically, when the density per unit area and the compaction density of the positive electrode film layer are relatively low, the positive electrode film layer contains few positive electrode active material per unit area, resulting in a decrease in the mass energy density of the secondary battery; when the density per unit area and the compaction density of the positive electrode film layer are too high, the positive electrode film layer contains more positive electrode active material per unit area, and the transition metal dissolved out from and deposited on the negative electrode is too large, thereby affecting the cycle performance of the secondary battery.

[Positive Electrode Plate]

The positive electrode plate includes a positive electrode current collector and a positive electrode film layer disposed on at least one surface of the positive electrode current collector, and the positive electrode film layer includes the positive electrode active material of the present application.

As an example, the positive electrode current collector has two surfaces opposite to each other in its own thickness direction, and the positive electrode film layer is disposed on any one or both of the two opposite surfaces of the positive electrode current collector.

In some embodiments of the present application, a metal foil or a composite current collector may be used as the positive electrode current collector. For example, as the metal foil, an aluminum foil may be used. The composite current collector may include a polymer material substrate and a metal layer formed on at least one surface of the polymer material substrate. The composite current collector can be formed by forming a metal material (aluminum, aluminum alloy, nickel, nickel alloy, titanium, titanium alloy, silver, silver alloy, etc.) on a polymer material substrate (such as polypropylene (PP), polyethylene terephthalate (PET), polybutylene terephthalate (PBT), polystyrene (PS), and polyethylene (PE)).

In some embodiments of the present application, the positive electrode film layer further optionally includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylic resin.

In some embodiments of the present disclosure, the positive electrode film layer further optionally includes a conductive agent. As an example, the conductive agent may include at least one of superconducting carbon, acetylene black, carbon black, Ketjen black, a carbon dot, a carbon nanotube, a graphene, and a carbon nanofiber.

In some embodiments of the present disclosure, the positive electrode plate can be prepared in the following manner: dispersing the components described above for preparing the positive electrode plate, such as the positive electrode active material, the conductive agent, the binder, and any other components, in a solvent (such as N-methylpyrrolidone) to form a positive electrode slurry; and coating the positive electrode current collector with the positive electrode slurry, and performing drying, cold pressing, and other processes, such that the positive electrode plate can be obtained.

[Electrolyte]

The electrolyte conducts ions between the positive electrode plate and the negative electrode plate. The present application has no specific restrictions on the type of the electrolyte, which can be selected according to needs. For example, the electrolyte may be liquid, gel, or all solid.

In some embodiments, the electrolyte is an electrolytic solution. The electrolytic solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalate)borate, lithium difluorobis(oxalato)phosphate, and lithium tetrafluoro(oxalato)phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolytic solution further optionally includes an additive. The additive may include a negative electrode film-forming additive and a positive electrode film-forming additive, and may further include an additive capable of improving certain properties of the battery, such as an additive for improving the overcharge performance of the battery, and an additive for improving the high- or low-temperature performance of the battery.

[Separator]

In some embodiments, the secondary battery further includes a separator. The present application does not particularly limit the type of the separator, and any porous-structure separator known to have good chemical stability and mechanical stability may be selected and used.

In some embodiments, the separator may be made of a material selected from at least one of glass fiber, non-woven fabric, polyethylene, polypropylene, and polyvinylidene fluoride. The separator may be a single-layer film or a multi-layer composite film, and there is no particular limitation on this. When the separator is a multi-layer composite film, the materials of the layers may be the same or different, and there is no particular limitation on this.

Preparation Method

In some embodiments, the positive electrode plate, the negative electrode plate, and the separator may be manufactured into an electrode assembly through a winding process or a stacking process.

In some embodiments, a mass energy density of the secondary battery is 280 Wh/kg to 500 Wh/kg, and optionally 360 Wh/kg to 500 Wh/kg or 400 Wh/kg to 500 Wh/kg; and/or, the capacity C0 of the secondary battery is 35 Ah to 200 Ah, and optionally, 45 Ah to 190 Ah.

In some embodiments, the mass energy density of the secondary battery may be 280 Wh/kg, 300 Wh/kg, 320 Wh/kg, 350 Wh/kg, 360 Wh/kg, 370 Wh/kg, 380 Wh/kg, 390 Wh/kg, 400 Wh/kg, 410 Wh/kg, 420 Wh/kg, 430 Wh/kg, 450 Wh/kg, 500 Wh/kg, or a numerical value in a range formed by any two of the foregoing values.

In some embodiments, the capacity C0 of the secondary battery is 35 Ah, 40 Ah, 43 Ah, 45 Ah, 48 Ah, 50 Ah, 60 Ah, 80 Ah, 100 Ah, 130 Ah, 160 Ah, 200 Ah, or a numerical value in a range formed by any two of the foregoing values.

In the present application, the mass energy density of the secondary battery may be measured using methods and devices commonly used in the art. As an example, for the mass energy density of the secondary battery, the following steps may be followed: the battery cell is left to stand at a certain temperature (e.g., 25° C.) for a certain time (e.g. 2 h) to ensure that the temperature of the battery cell is room temperature (e.g., 25° C.). After the battery cell is charged at a certain rate (e.g., 0.33C) to a charge cut-off voltage at a certain temperature (e.g., 25° C.), and constant-voltage charging is continued at the charge cut-off voltage until the current reaches 0.05C, at which point charging is terminated (where C represents the rated capacity of the battery cell). After the battery cell is left to stand at a certain temperature (e.g., 25° C.) for a certain time (e.g., 1 h), the battery cell is discharged at a certain rate (0.33C) to a discharge cut-off voltage at a certain temperature (e.g., 25° C.), and the total discharge energy of the battery cell is recorded as E0. The battery cell is placed on an electronic balance until the weight stabilized, and the battery cell weight M0 is recorded. The mass energy density of the battery=the discharge energy E0 of the battery cell/battery cell weight M0.

In some embodiments, the outer packaging of the secondary battery may be a hard shell, such as a hard plastic shell, an aluminum shell, or a steel shell. The outer packaging of the secondary battery may also be a soft pack, such as a pouch-type soft pack. The soft pack may be made of plastic, and examples of the plastic may include polypropylene, polybutylene terephthalate, polybutylene succinate, and the like.

The present application does not particularly limit the shape of the secondary battery, and it may have a cylindrical shape, a prismatic shape, or any other shape. For example, FIG. 1 shows a secondary battery 5 having a prismatic structure as one example.

Figure 2:
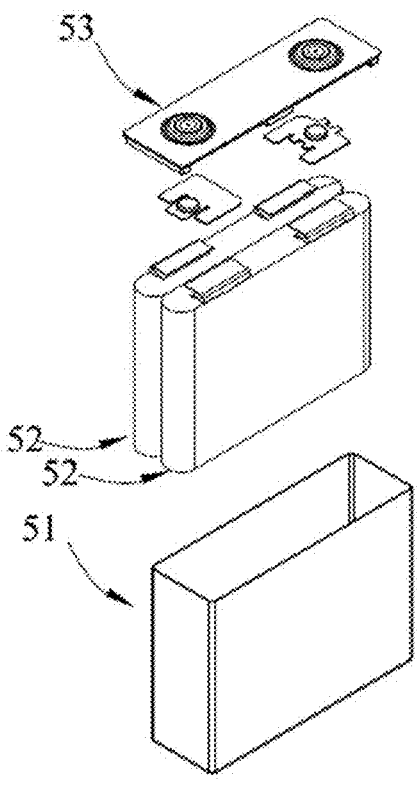
FIG. 2 is an exploded view of the secondary battery according to the embodiment of the present application shown in FIG. 1.

In some embodiments, referring to FIG. 2, the outer packaging may include a housing 51 and a cover plate 53. The housing 51 may include a bottom plate and a side plate connected to the bottom plate, and the bottom plate and the side plate define, in an enclosing manner, an accommodating cavity. The housing 51 is provided with an opening communicating with the accommodating cavity, and the cover plate 53 is capable of lidding the opening to close the accommodating cavity. The positive electrode plate, the negative electrode plate, and the separator may be subjected to a winding process or a stacking process to form an electrode assembly 52. The electrode assembly 52 is packaged in the accommodating cavity. The electrolytic solution is infiltrated into the electrode assembly 52. The number of the electrode assembly 52 included in the secondary battery 5 may be one or more, and those skilled in the art can select the number according to specific and actual needs.

In some embodiments, the housing weight z of the secondary battery and the bare cell weight JR of the secondary battery satisfy the following relationship: $0.01 \le z/JR \le 0.42$; optionally, $0.01 \le z/JR \le 0.1$ or $0.02 \le z/JR \le 0.07$.

In some embodiments, z/JR may be 0.015, 0.025, 0.03, 0.04, 0.05, 0.06, 0.07, 0.08, 0.09, 0.1, 0.2, 0.3, 0.4, or a numerical value in a range formed by any two of the foregoing values.

In some embodiments, the secondary battery is a pouch cell having z/JR of 0.01 to 0.1 or 0.03 to 0.07.

In some embodiments, the secondary battery is a hard-case cell having z/JR of 0.1 to 0.42 or 0.1 to 0.3.

Through the above structural design, the mass energy density of the secondary battery can be significantly improved, and meanwhile, the outer wall has enough structural strength, and thus the secondary battery has higher safety performance.

[Battery Module]

According to some embodiments, the battery cell may be assembled into a battery module. The number of battery cells included in the battery module may be one or more, and the specific number may be selected by those skilled in the art based on the use and capacity of the battery module.

Figure 3:
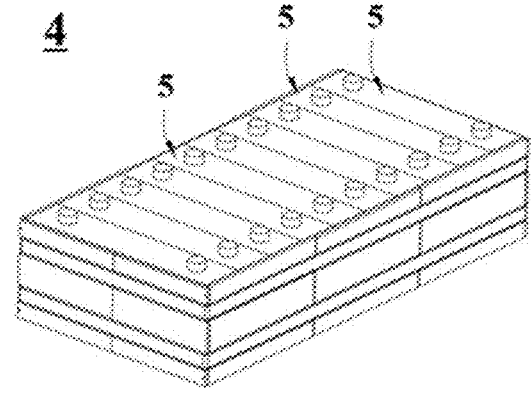
FIG. 3 is a schematic diagram of a battery module according to one embodiment of the present application.

FIG. 3 shows a battery module 4 as one example. Referring to FIG. 3, in the battery module 4, a plurality of battery cells 5 may be sequentially arranged in a length direction of the battery module 4. Certainly, the arrangement may also be in any other manner. Further, the plurality of battery cells 5 may be fixed by a fastener.

Optionally, the battery module 4 may further include a shell having an accommodating space in which the plurality of battery cells 5 are accommodated.

[Battery Pack]

In some embodiments, the battery module described above may also be assembled into a battery pack. The number of battery modules included in the battery pack may be one or more, and the specific number may be selected by those skilled in the art based on the use and capacity of the battery pack.

Figure 4:
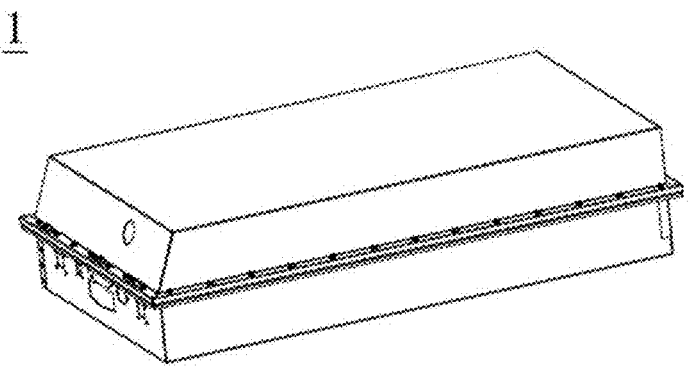
FIG. 4 is a schematic diagram of a battery pack according to one embodiment of the present application.
Figure 5:
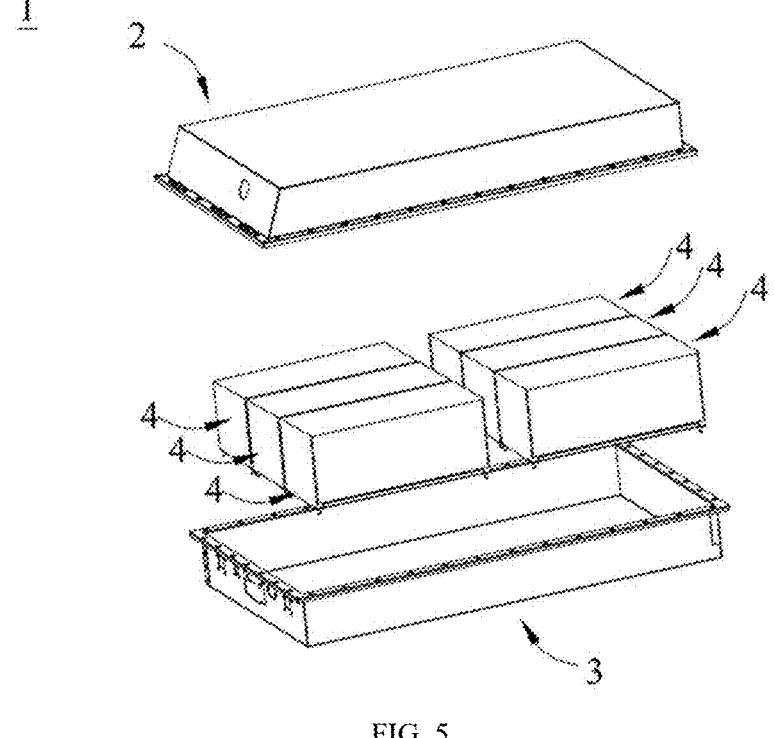
FIG. 5 is an exploded view of the battery pack according to the embodiment of the present application as shown in FIG. 4.

FIG. 4 and FIG. 5 show a battery pack 1 as one example. Referring to FIG. 4 and FIG. 5, the battery pack 1 may include a battery case and a plurality of battery modules 4 arranged in the battery case. The battery case includes an upper case body 2 and a lower case body 3. The upper case body 2 is capable of lidding the lower case body 3 to form a closed space for accommodating the battery modules 4. The plurality of battery modules 4 may be arranged in any manner in the battery case.

[Electric Device]

A second aspect of the present application provides an electric device, including the secondary battery according to the first aspect of the present application.

The electric device may include, but is not limited to, a mobile device (e.g., a mobile phone or a laptop computer), an electric vehicle (e.g., a pure electric vehicle, a hybrid electric vehicle, a plug-in hybrid electric vehicle, an electric bicycle, an electric scooter, an electric golf cart, or an electric truck), an electric train, ship, or satellite, an energy storage system, or the like.

As the electric device, a secondary battery, a battery module, or a battery pack may be selected based on its usage requirements.

Figure 6:
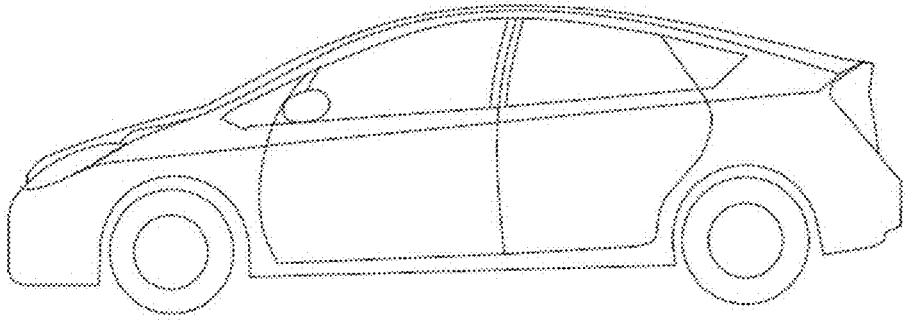
FIG. 6 is a schematic diagram of an electric device using a secondary battery as a power source according to one embodiment of the present application.

FIG. 6 shows an electric device as one example. The electric device is a pure electric vehicle, a hybrid electric vehicle, a plug-in hybrid electric vehicle, or the like. To meet the requirements of the electric device for high power and high mass energy density of the secondary battery, the battery pack or the battery module may be used.

As another example, the device may be a mobile phone, a tablet computer, a laptop computer, or the like. The device is generally required to be light and thin, and a secondary battery can thus be used as a power source.

EXAMPLES

Hereinafter, examples of the present application are described. The examples described below are illustrative and are merely used to explain the present application, and they should not be construed as limiting the present application. The examples without techniques or conditions specified therein are implemented according to techniques or conditions described in the literature in the art or according to product instructions. Reagents or instruments used herein without specified manufacturers are all commercially available conventional products.

Example 1

I. Preparation Method

1. Preparation of Positive Electrode Plate

Preparation of positive electrode active material: lithium hydroxide and a dried high-nickel ternary precursor were weighed according to the stoichiometric ratio of the chemical formula, the mixture was then uniformly mixed in a high-speed mixer, sintered in a kiln at a sintering temperature of 760° C. for 20 h under the sintering atmosphere of oxygen, and cooled to obtain a matrix material. The material was washed with water for 30 min according to a mass ratio of 1:5, centrifuged, filtered, and then subjected to vibration drying at a vibration frequency of 30 Hz for 5 h to obtain a positive electrode active material.

The positive electrode active material, a conductive agent carbon black, and a binder polyvinylidene fluoride (PVDF) were added to an N-methylpyrrolidone (NMP) solution according to a mass ratio of 97%:1%:2%, and the mixture was uniformly mixed to obtain a positive electrode slurry; then a positive electrode current collector was uniformly coated with the positive electrode slurry, the surface of an aluminum foil was coated with the positive electrode slurry by using a slot-die coater, followed by drying, and then the coated electrode plate was subjected to cold pressing treatment by using a cold pressing machine to prepare a final positive electrode plate.

(2) Preparation of Negative Electrode Plate

Preparation of carbon-silicon composite material: a silicon precursor was generated to attach to silicon nanoparticles on the porous carbon skeleton through chemical vapor deposition to obtain the carbon-silicon composite. The dimension of the silicon nanoparticles in the carbon-silicon material and the deposition depth of the silicon nanoparticles in the porous carbon material were controlled by adjusting the deposition conditions including gas flow rate and reaction chamber pressure.

A negative electrode active material artificial graphite and a carbon-silicon composite material, a conductive agent carbon black, a carbon nanotube, a binder styrene-butadiene rubber (SBR), and a thickener sodium carboxymethyl cellulose (CMC) were thoroughly stirred and uniformly mixed in a proper amount of deionized water according to a certain proportion to form a uniform negative electrode slurry; a negative electrode current collector was coated with the negative electrode slurry, and was subjected to processes such as drying to obtain a negative electrode film layer, where the aspect ratio of the carbon nanotube was 3000, and the mass percentage content of the carbon nanotube was 0.4% based on the total mass of the negative electrode film layer.

3. Separator

A polyethylene film (PE separator) was used as a separator.

4. Electrolytic Solution

Ethylene carbonate, ethyl methyl carbonate, and diethyl carbonate were mixed according to a volume ratio of 1:1:1 to obtain an organic solvent. Then, a fully dried lithium salt (LiPF6) was dissolved in the mixed organic solvent to prepare an electrolytic solution with a concentration of 1 mol/L.

(5) Preparation of Battery

The positive electrode plate, the separator, and the negative electrode plate described above were wound in sequence to obtain a bare cell; and the bare cell was placed in a pouch packaging shell, followed by drying, injection of the electrolytic solution, vacuum packaging, standing, formation, shaping and other processes, to obtain a lithium-ion battery.

Examples 2-4

The preparation method is similar to that of Example 1, except that the design parameters of a housing were adjusted in Examples 2-3, and a hard packaging shell was adopted and the design parameters of the housing were also adjusted in Example 4, as shown in Table 1 for details.

Examples 5-20

The preparation method is similar to that of Example 1, except that the relevant parameters in the preparation steps of the negative electrode active material or the positive electrode active material were adjusted, as shown in Table 1 for details.

Comparative Examples 1-4

The preparation method is similar to that of Example 1, except that the type of the added negative electrode active material or the relevant parameters in the preparation steps of the positive electrode active material or the negative electrode active material were adjusted, and a hard packaging shell was adopted in Comparative Example 1, as shown in Table 1 for details.

II. Performance Test

1. Battery Performance Test

1.1. Mass Energy Density

1) The discharge energy of the battery cell was measured as follows:

The battery cell was left to stand at 25° C. for 2 h to ensure that the temperature of the battery cell was 25° C. At 25° C., the battery cell was charged at 0.33C to a charge cut-off voltage, and constant-voltage charging was continued at the charge cut-off voltage until the current reached 0.05C, at which point charging was terminated (where C represents the rated capacity of the battery cell). After the battery cell was left to stand at 25° C. for 1 h, the battery cell was discharged at 0.33C to a discharge cut-off voltage at 25° C., and the total discharge energy of the battery cell was recorded as E0. The charge cut-off voltage was 4.25V, and the discharge cut-off voltage was 2.0V.

2) The weight of the battery cell was measured as follows:

The battery cell was placed on an electronic balance until the weight stabilized, and the battery cell weight M0 was recorded.

3) The calculation formula for the mass energy density of the battery was as follows:

The mass energy density of the battery=the discharge energy E0 of the battery cell/battery cell weight M0

1.2. Cycle Performance

The voltage calibration method was as follows:

The battery cell was left to stand at 25° C. for 2 h to ensure that the temperature of the battery cell was 25° C. The battery cell was charged at 0.33C0 to 4.25V at 25° C., charged to a current of 0.05C0 at a constant voltage of 4.25V, and then left to stand for 1 h. The discharging was performed at 0.33C0 to 0.95C0 at 25° C., and the voltage V1 at this time was recorded. After standing for 5 min, the discharging was performed at 0.33C0 to 2.0V at 25° C. After standing for 5 min, the battery cell was charged at 0.33C0 to 0.97C0 at 25° C., and after standing for 5 min, the voltage V2 at this time was recorded.

The cycle test procedure was as follows:

The battery cell was left to stand at 25° C. for 2 h to ensure that the temperature of the battery cell was 25° C. The battery cell was charged at 0.33C0 to a voltage of V2 at 25° C. and then left to stand for 0.5 h. The battery cell was discharged at 0.33C0 to V1 at 25° C., left to stand for 0.5 h, and subjected to a full charge-discharge cycle test until the capacity of the secondary battery was attenuated to 80% of the initial capacity. The test was stopped, and the cycle number was recorded.

1.3. Rate Capability

At 25° C., the battery was charged to full capacity at x C, and then discharged at 1C to cut-off voltage; this cycle was repeated for 10 times, and then the battery was charged to full capacity at x C; then the negative electrode plate was taken out after the battery was disassembled, and the lithium plating on the surface of the negative electrode plate was observed. If no lithium was separated from the surface of the negative electrode plate, the charging rate x C gradually increased by taking 0.1C as a gradient to perform the test again until the lithium was separated from the surface of the negative electrode plate; the test was stopped, and at this time, the maximum charging rate of the battery was obtained by subtracting 0.1C from the charging rate. The full charge cut-off voltage was 4.25V, and the full discharge cut-off voltage was 2.0V.

1.4. Capacity Test

The battery cell was left to stand at 25° C. for 2 h to ensure that the temperature of the battery cell was 25° C. At 25° C., the battery cell was charged at 0.33C to a charge cut-off voltage, and constant-voltage charging was continued at the charge cut-off voltage until the current reached 0.05C, at which point charging was terminated (where C represents the rated capacity of the battery cell). After the battery cell was left to stand at 25° C. for 1 h, the battery cell was discharged at 0.33C to a discharge cut-off voltage at 25° C., and the total discharge capacity C0 discharged from the battery cell was recorded. The charge cut-off voltage was 4.25V, and the discharge cut-off voltage was 2.0V.

1.5. Housing Weight of Battery and Bare Cell Weight

Firstly, the bare cell was separated from the shell of the battery; secondly, in order to remove the electrolytic solution free in the bare cell, the bare cell could be soaked in a dimethyl carbonate (DMC) solvent for 4 h, and then the bare cell was transferred to a blast air oven at 60° C. for drying for 4 h to obtain a dried bare cell; and thirdly, the shell of the battery and the bare cell were separately placed on an electronic balance for weighing to obtain the housing weight (z) of the secondary battery and the bare cell weight (JR).

2. Performance Test for Positive Electrode Plate and Negative Electrode Plate

2.1. Method for Measuring Density Per Unit Area of Positive Electrode Film Layer on Single Side of Positive Electrode Plate and Negative Electrode Film Layer on Single Side of Negative Electrode Plate When one surface of the electrode plate was coated, the density per unit area of the film layer on the single side of the electrode plate was =m/S, and when both surfaces of the electrode plate were coated, the density per unit area of the film layer on the single side of the electrode plate was = m/(2×S), where m represents the weight of the film layer, and S represents the area of the film layer. m may be obtained by subtracting the weight of the current collector from the weight of the electrode plate, and the length and the width of the film layer may be obtained by measuring using a graduated scale.

2.2. Method for Testing Energy Per Unit Area of Positive Electrode Film Layer on Single Side of Positive Electrode Plate The battery cell was left to stand at 25° C. for 2 h to ensure that the temperature of the battery cell was 25° C. At 25° C., the battery cell was charged at 0.33C to a charge cut-off voltage, and constant-voltage charging was continued at the charge cut-off voltage until the current reached 0.05C, at which point charging was terminated (where C represents the rated capacity of the battery cell). After the battery cell was left to stand at 25° C. for 1 h, the battery cell was discharged at 0.33C to a discharge cut-off voltage at 25° C., the total discharge capacity C0 discharged from the battery cell was recorded, and the total discharge energy was E0. The battery was disassembled, the positive electrode plate was taken out, and the length and the width of the film on the positive electrode plate were measured by using a graduated scale to obtain the area value S0 of the positive electrode film layer. When both surfaces of the positive electrode plate were coated, the energy per unit area of the positive electrode film layer was =E0/(2× S0); when one surface of the positive electrode plate was coated, the energy per unit area of the positive electrode film layer was =E0/S0. The charge cut-off voltage was 4.25V, and the discharge cut-off voltage was 2.0V.

2.3. Method for Measuring Content of Silicon Element in Carbon-Silicon Composite Material The content of the silicon element was determined by an inductively coupled plasma (ICP) test, specifically as follows: a silicon-carbon composite material was taken and digested with aqua regia and hydrofluoric acid (HF); as the digestion time was in positive correlation with the depth of the dissolved silicon element in silicon-carbon particles, the solutions with different digestion times in this experiment were subjected to gradient ICP tests, and combined with the statistical analysis results of transmission electron microscope (TEM) of the silicon-carbon material, it was found that, the silicon content in the solution digested for 15 min was the silicon content of "the outer peripheral area of the carbon-silicon composite material", and the difference value between the silicon content in the completely digested solution and the silicon content in the solution digested for 15 min was the silicon content of "the central area of the carbon-silicon composite".

2.4. Method for Measuring Content of Carbon Element in Carbon-Silicon Composite Material The content of the carbon element was determined by the infrared absorption method for carbon-sulfur content analysis according to the GB/T 20123-2006 test standard, specifically as follows: after the battery was disassembled, the negative electrode plate was taken out, the binder was removed, and the carbon-silicon composite material was taken as a sample; the carbon content at 20 min was tested as the carbon content of "the outer peripheral area of the carbon-silicon composite", and the difference value between the carbon content at 20 min and the carbon content at the end of testing was tested as the carbon content of "the central area of the carbon-silicon composite material".

2.5. Method for Measuring Short Diameter r of Carbon-Silicon Composite Material The short diameter r was determined according to the three-axis characterization method, specifically as follows: the short diameter r was determined on a plane projection diagram of the carbon-silicon composite.

III. Analysis of Test Results of Examples and Comparative Examples

The batteries of the examples and comparative examples were prepared according to the methods described above, and various performance parameters were measured. The parameters of the secondary battery are shown in Table 1 below, and the performance test results of the secondary battery are shown in Table 2 below.

TABLE 1

| | | | | | | | | | | | | |
|---|---|---|---|---|---|---|---|---|---|---|---|---|
| | | | | Parameters of secondary battery | | | | | | | | |
| | Positive electrode plate | | | | Negative electrode plate | | | | | | | |
| No. | Positive electrode active material | X | y | M | Density per unit area of positive electrode film layer (mg/cm$^2$) | Negative electrode active material | Mass percentage content of carbon-silicon material | Silicon content of carbon-silicon material | A2/ B2 | B1/ A1 | Density per unit area of negative electrode film layer (mg/cm$^2$) | Design parameters of housing z/JR |
| Example 1 | LiNi$_x$Co$_y$M$_{1-x-y}$O$_2$ | 0.95 | 0.03 | Mn | 28.6 | Three-dimensional network cross-linked silicon-carbon material + graphite | 40% | 40% | 2 | 1.2 | 8.8 | 0.050 |
| Example 2 | LiNi$_x$Co$_y$M$_{1-x-y}$O$_2$ | 0.95 | 0.03 | Mn | 28.6 | Three-dimensional network cross-linked silicon-carbon material + graphite | 40% | 40% | 2 | 1.2 | 8.8 | 0.026 |
| Example 3 | LiNi$_x$Co$_y$M$_{1-x-y}$O$_2$ | 0.95 | 0.03 | Mn | 28.6 | Three-dimensional network cross-linked silicon-carbon material + graphite | 40% | 40% | 2 | 1.2 | 8.8 | 0.170 |
| Example 4 | LiNi$_x$Co$_y$M$_{1-x-y}$O$_2$ | 0.95 | 0.03 | Mn | 28.6 | Three-dimensional network cross-linked silicon-carbon material + graphite | 40% | 40% | 2 | 1.2 | 8.8 | 0.509 |
| Example 5 | LiNi$_x$Co$_y$M$_{1-x-y}$O$_2$ | 0.95 | 0.03 | Mn | 28.6 | Three-dimensional network cross-linked silicon-carbon material | 100% | 40% | 2 | 1.2 | 4.7 | 0.050 |
| Example 6 | LiNi$_x$Co$_y$M$_{1-x-y}$O$_2$ | 0.95 | 0.03 | Mn | 28.6 | Three-dimensional network cross-linked silicon-carbon material + graphite | 20% | 40% | 2 | 1.2 | 12.4 | 0.053 |
| Example 7 | LiNi$_x$Co$_y$M$_{1-x-y}$O$_2$ | 0.95 | 0.03 | Mn | 28.6 | Three-dimensional network cross-linked silicon-carbon material + graphite | 30% | 40% | 2 | 1.2 | 10.3 | 0.050 |
| Example 8 | LiNi$_x$Co$_y$M$_{1-x-y}$O$_2$ | 0.95 | 0.03 | Mn | 28.6 | Three-dimensional network cross-linked silicon-carbon material + graphite | 10% | 40% | 2 | 1.2 | 15.6 | 0.056 |
| Example 9 | LiNi$_x$Co$_y$M$_{1-x-y}$O$_2$ | 0.85 | 0.11 | Mn | 28.6 | Three-dimensional network cross-linked silicon-carbon material + graphite | 40% | 40% | 2 | 1.2 | 7.8 | 0.048 |
| Example 10 | LiNi$_x$Co$_y$M$_{1-x-y}$O$_2$ | 0.98 | 0.01 | Mn | 28.6 | Three-dimensional network cross-linked silicon-carbon material + graphite | 40% | 40% | 2 | 1.2 | 9.2 | 0.049 |
| Example 11 | LiNi$_x$Co$_y$M$_{1-x-y}$O$_2$ | 0.85 | 0.15 | / | 28.6 | Three-dimensional network cross-linked silicon-carbon material + graphite | 40% | 40% | 2 | 1.2 | 7.7 | 0.048 |
| Example 12 | LiNi$_x$Co$_y$M$_{1-x-y}$O$_2$ | 0.92 | 0.08 | / | 28.6 | Three-dimensional network cross-linked silicon-carbon material + graphite | 40% | 40% | 2 | 1.2 | 8.3 | 0.048 |
| Example 13 | LiNi$_x$Co$_y$M$_{1-x-y}$O$_2$ | 0.95 | 0.03 | Mn | 19.5 | Three-dimensional network cross-linked silicon-carbon material + graphite | 40% | 40% | 2 | 1.2 | 6 | 0.050 |

TABLE 1-continued

| | Parameters of secondary battery | | | | | | | | | | |
|---|---|---|---|---|---|---|---|---|---|---|---|
| | Positive electrode plate | | | | | Negative electrode plate | | | | | |
| No. | Positive electrode active material | X | y | M | Density per unit area of positive electrode film layer (mg/cm$^2$) | Negative electrode active material | Mass percentage content of carbon-silicon material | Silicon content of carbon-silicon material | A2/ B2 | B1/ A1 | Density per unit area of negative electrode film layer (mg/cm$^2$) | Design parameters of housing z/JR |
| Example 14 | LiNi$_x$Co$_y$M$_{1-x-y}$O$_2$ | 0.95 | 0.03 | Mn | 42.2 | Three-dimensional network cross-linked silicon-carbon material + graphite | 40% | 40% | 2 | 1.2 | 13 | 0.052 |
| Example 15 | LiNi$_x$Co$_y$M$_{1-x-y}$O$_2$ | 0.95 | 0.03 | Mn | 25 | Three-dimensional network cross-linked silicon-carbon material + graphite | 40% | 40% | 2 | 1.2 | 7.7 | 0.049 |
| Example 16 | LiNi$_x$Co$_y$M$_{1-x-y}$O$_2$ | 0.95 | 0.03 | Mn | 45 | Three-dimensional network cross-linked silicon-carbon material + graphite | 40% | 40% | 2 | 1.2 | 13.85 | 0.049 |
| Example 17 | LiNi$_x$Co$_y$M$_{1-x-y}$O$_2$ | 0.95 | 0.03 | Mn | 28.6 | Three-dimensional network cross-linked silicon-carbon material + graphite | 40% | 40% | 60 | 3 | 8.8 | 0.050 |
| Example 18 | LiNi$_x$Co$_y$M$_{1-x-y}$O$_2$ | 0.95 | 0.03 | Mn | 28.6 | Three-dimensional network cross-linked silicon-carbon material + graphite | 40% | 40% | 1.6 | 0.8 | 8.8 | 0.050 |
| Example 19 | LiNi$_x$Co$_y$M$_{1-x-y}$O$_2$ | 0.95 | 0.03 | Mn | 28.6 | Three-dimensional network cross-linked silicon-carbon material + graphite | 40% | 40% | 50 | 2.5 | 8.8 | 0.050 |
| Example 20 | LiNi$_x$Co$_y$M$_{1-x-y}$O$_2$ | 0.95 | 0.03 | Mn | 28.6 | Three-dimensional network cross-linked silicon-carbon material + graphite | 40% | 40% | 3 | 1.5 | 8.8 | 0.050 |
| Comparative Example 1 | LiNi$_x$Co$_y$M$_{1-x-y}$O$_2$ | ⅓ | ⅓ | Mn | 28.6 | Conventional carbon-silicon material + graphite | 40% | 40% | 2 | 1.2 | 6.4 | 0.495 |
| Comparative Example 2 | LiNi$_x$Co$_y$M$_{1-x-y}$O$_2$ | ⅓ | ⅓ | Mn | 28.6 | Three-dimensional network cross-linked silicon-carbon material + graphite | 40% | 40% | 2 | 1.2 | 6.7 | 0.048 |
| Comparative Example 3 | LiNi$_x$Co$_y$M$_{1-x-y}$O$_2$ | 0.95 | 0.03 | Mn | 28.6 | Silicon oxide material + graphite | 40% | 40% | 2 | 1.2 | 10.6 | 0.055 |
| Comparative Example 4 | LiNi$_x$Co$_y$M$_{1-x-y}$O$_2$ | 0.95 | 0.03 | Mn | 28.6 | Silicon oxide material | 100% | 40% | 2 | 1.2 | 6.1 | 0.056 |

TABLE 2

Performance test results of positive electrode plate and secondary battery

| No. | Mass energy density (Wh/kg) | Energy per unit area of positive electrode film layer on single side of positive electrode plate (mWh/cm$^2$) | Cycle number (cycle) at 80% capacity retention | Maximum constant-current charging rate (100% SOC) | C0 (Ah) |
|---|---|---|---|---|---|
| Example 1 | 407.6 | 21.1 | 950 | 0.65 C | 46.70 |
| Example 2 | 416.1 | 22.5 | 900 | 0.6 C | 194.46 |
| Example 3 | 349.6 | 21.7 | 650 | 0.64 C | 101.62 |
| Example 4 | 284.4 | 21.7 | 640 | 0.63 C | 101.62 |
| Example 5 | 448.6 | 21.8 | 80 | 0.3 C | 51.15 |
| Example 6 | 373.5 | 22.2 | 1030 | 0.69 C | 40.03 |
| Example 7 | 388.3 | 22.1 | 980 | 0.66 C | 44.48 |
| Example 8 | 347.2 | 22.2 | 1100 | 0.75 C | 35.58 |
| Example 9 | 380.5 | 19.7 | 1200 | 0.59 C | 43.55 |
| Example 10 | 419 | 22.9 | 750 | 0.63 C | 48.72 |
| Example 11 | 370.5 | 19.2 | 700 | 0.71 C | 42.98 |
| Example 12 | 396.8 | 21 | 580 | 0.65 C | 46.82 |
| Example 13 | 383.6 | 15 | 990 | 0.8 C | 43.97 |
| Example 14 | 415.1 | 32.4 | 610 | 0.4 C | 45.99 |
| Example 15 | 401.8 | 19.2 | 960 | 0.66 C | 46.70 |
| Example 16 | 423.4 | 34.5 | 480 | 0.33 C | 49.03 |
| Example 17 | 407.6 | 21.1 | 360 | 0.27 C | 46.70 |
| Example 18 | 407.6 | 21.1 | 800 | 0.5 C | 46.70 |
| Example 19 | 407.6 | 21.1 | 400 | 0.3 C | 46.70 |
| Example 20 | 407.6 | 21.1 | 830 | 0.52 C | 46.70 |
| Comparative Example 1 | 239.8 | 14.7 | 450 | 0.4 C | 83.85 |
| Comparative Example 2 | 340.2 | 16.9 | 980 | 0.82 C | 38.92 |
| Comparative Example 3 | 390.3 | 21.9 | 650 | 0.6 C | 40.03 |
| Comparative Example 4 | 432.4 | 21.8 | 30 | 0.28 C | 44.48 |

From the results in the above tables, it can be seen from Comparative Example 1 and Examples 1 to 20, Comparative Example 2 and Example 1, and Examples 9 to 12 that when the nickel content in the positive electrode active material is ≥85%, the obtained secondary battery has a high mass energy density and the positive electrode film layer has a high energy per unit area. It can be seen from Comparative Example 1 and Examples 1 to 20 that when the negative electrode active material includes a carbon-silicon composite material having a three-dimensional network cross-linked pore structure, the obtained secondary battery has better cycle performance. It can be seen from Comparative Example 3 and Example 1, and Comparative Example 4 and Example 5 that the carbon-silicon composite material can improve the cycle performance of the secondary battery as compared to other composite materials, such as a silicon oxide material.

It can be seen from Examples 1 to 4 that with the same type of packaging shell, the mass energy density of the secondary battery is improved as the ratio of the housing weight to the bare cell weight decreases. The ratio of the housing weight of the secondary battery to the bare cell weight is controlled within the ranges of the present application, and thus the secondary battery has a higher mass energy density.

It can be seen from Example 1, and Examples 5 to 8 that the mass percentage content of the carbon-silicon composite material affects the mass energy density, the cycle performance, and the rate capability of the secondary battery. When the mass percentage content of the carbon-silicon composite material is 20% to 100%, the secondary battery has a better mass energy density. Further, when the mass percentage content of the carbon-silicon composite material is 30% to 40%, the balance of mass energy density, cycle performance and rate capability is considered.

It can be seen from Example 1, and Examples 17 to 20 that the ratio of the silicon element to the carbon element in the negative electrode active material affects the cycle performance and the rate capability of the secondary battery. Specifically, when the ratio B1/A1 is adjusted to a value between 0.8 and 2.5, particularly between 1 and 1.5, and the ratio A2/B2 is adjusted to a value between 1.05 and 50, particularly between 1.05 and 3, the cycle performance and the rate capability of the secondary battery can be improved.

It can be seen from Example 1, and Examples 13 to 16 that the increased density per unit area of the film layer may increase the mass energy density of the secondary battery and the energy per unit area of the positive electrode film layer, but may affect the cycle performance and the rate capability of the secondary battery to some extent. The obtained secondary battery has a balance of mass energy density, energy per unit area of the positive electrode film layer, cycle performance and rate capability within the ranges of the density per unit area of the positive electrode film layer and the negative electrode film layer.

In conclusion, the secondary battery of the present application acquires a higher mass energy density and improved cycle performance and rate capability through the close cooperation between the negative electrode active material and the positive electrode active material.

It should be noted that the present application is not limited to the embodiments described above. The embodiments described above are merely examples, and any embodiments having a structure substantially identical to the technical concept and exerting the same functional effects within the scope of the technical solutions of the present application are all included within the technical scope of the present application. Furthermore, without departing from the spirit of the present application, various modifications that can be conceived by those skilled in the art to the embodiments, as well as other embodiments formed by combining some of the constituent elements of the embodiments, are also included within the scope of the present application.

What is claimed is:

1. A secondary battery, comprising:
a positive electrode plate, wherein the positive electrode plate comprises a positive electrode film layer, the positive electrode film layer comprises a positive electrode active material containing transition metal elements, based on a total molar number of the transition metal elements in the positive electrode active material, a molar content of a nickel element is not lower than 85%, and an energy per unit area of the positive electrode film layer on a single side of the positive electrode plate is 15-35 mWh/cm$^2$; a density per unit area of the positive electrode film layer on a single side of the positive electrode plate is 18 mg/cm$^2$ to 45 mg/cm$^2$; and
a negative electrode plate, wherein the negative electrode plate comprises a negative electrode film layer, the negative electrode film layer comprises a negative electrode active material containing a carbon-silicon composite material, and the carbon-silicon composite material comprises carbon matrix particles having a carbon skeleton and silicon nanoparticles attached to the carbon skeleton, a mass percentage content A of a carbon element of the carbon-silicon composite material relative to a total mass of the carbon-silicon composite material has a decreasing trend in a direction from a geometric center of the carbon-silicon composite material to an outer surface of the carbon-silicon composite material,
the battery is a pouch cell, a housing weight z of the secondary battery and a bare cell weight JR of the secondary battery satisfy the following relationship: $0.01 \leq z/JR \leq 0.1$.

2. The secondary battery according to claim 1, wherein a housing weight z of the secondary battery and a bare cell weight JR of the secondary battery satisfy the following relationship: $0.02 \leq z/JR \leq 0.07$.

3. The secondary battery according to claim 1, the carbon matrix particles comprise a three-dimensional network cross-linked pore structure, and at least a part of the silicon nanoparticles are disposed in the three-dimensional network cross-linked pore structure.

4. The secondary battery according to claim 1, wherein in an outer peripheral area of the carbon-silicon composite material, the mass percentage content A1 of the carbon element of the carbon-silicon composite material relative to the total mass of the carbon-silicon composite material and a mass percentage content B1 of a silicon element of the carbon-silicon composite material relative to the total mass of the carbon-silicon composite material satisfy $0.8 \leq B1/A1 \leq 2.5$, wherein the outer peripheral area of the carbon-silicon composite material is an area extending from an outer surface of the carbon-silicon composite material to an interior of the carbon-silicon composite material by a distance of r/2 or less, wherein r represents a short diameter of the carbon-silicon composite material.

5. The secondary battery according to claim 1, wherein in a central area of the carbon-silicon composite material, a mass percentage content A2 of carbon element of the carbon-silicon composite material relative to the total mass of the carbon-silicon composite material and a mass percentage content B2 of a silicon element of the carbon-silicon composite material relative to the total mass of the carbon-silicon composite material satisfy $1.05 \leq A2/B2 \leq 50$, wherein the central area of the carbon-silicon composite material is an area with a distance from a geometric center of the carbon-silicon composite material within r/2, wherein r represents a short diameter of the carbon-silicon composite material.

6. The secondary battery according to claim 1, wherein a mass percentage content B of a silicon element of the carbon-silicon composite material relative to the total mass of the carbon-silicon composite material has an increasing trend in the direction from the geometric center of the carbon-silicon composite material to the outer surface of the carbon-silicon composite material.

7. The secondary battery according to claim 1, wherein a mass percentage content of the silicon nanoparticles in the carbon-silicon composite material is greater than or equal to 40%.

8. The secondary battery according to claim 1, wherein the negative electrode active material further comprises a carbon-based active material.

9. The secondary battery according to claim 8, wherein the carbon-based active material comprises one or more of graphite, hard carbon, soft carbon, and porous carbon.

10. The secondary battery according to claim 1, wherein a mass percentage content $\alpha$ of the carbon-silicon composite material is 10% to 100%, based on a total mass of the negative electrode active material.

11. The secondary battery according to claim 1, wherein the negative electrode film layer comprises a conductive agent, the conductive agent comprises carbon nanotubes, and an aspect ratio of the carbon nanotubes is >2500, and/or,
a mass percentage content of the carbon nanotubes is 0.1% to 0.5%.

12. The secondary battery according to claim 1, wherein the negative electrode plate satisfies that:
a density per unit area of the negative electrode film layer on a single side of the negative electrode plate is 4 mg/cm$^2$ to 15 mg/cm$^2$, and/or,
a compaction density of the negative electrode film layer on a single side of the negative electrode plate is 1.6 g/cm$^3$ to 1.8 g/cm$^3$.

13. The secondary battery according to claim 1, wherein the positive electrode active material comprises $Li_aNi_xCo_yM_{1-x-y}O_{2-b}$, wherein M comprises at least one of Mn, Al, B, Zr, Sr, Y, Sb, W, Ti, Mg, and Nb, and optionally, the M comprises at least one of Mn, Al, B, Zr, Sr, W, Mg, and Nb; $0.2 \leq a \leq 1.2$, and $0.2 \leq b \leq 0.2$; $0.85 \leq x \leq 1$, and $0 \leq y \leq 0.15$.

14. The secondary battery according to claim 1, wherein a compaction density of the positive electrode film layer on a single side of the positive electrode plate is 3.3 g/cm$^3$ to 3.6 g/cm$^3$.

15. The secondary battery according to claim 1, wherein a mass energy density of the secondary battery is 280 Wh/kg to 500 Wh/kg; and/or,
a capacity C0 of the secondary battery is 35 Ah to 200 Ah, and optionally, 45 Ah to 190 Ah.

16. An electric device, comprising the secondary battery according to claim 1.

17. The secondary battery according to claim 3, wherein the carbon matrix particles are porous with inter-connected pores having diameters of 2 nm-50 nm, forming the three-dimensional network cross-linked structure.

18. The secondary battery according to claim 4, wherein in the outer peripheral area of the carbon-silicon composite material, A1 and B1 satisfy $1 \leq B1/A1 \leq 1.5$.

19. The secondary battery according to claim 5, wherein in the central area of the carbon-silicon composite material, A2 and B2 satisfy $1.05 \leq A2/B2 \leq 3$.

20. The secondary battery according to claim 13, wherein in $Li_aNi_xCo_yM_{1-x-y}O_{2-b}$, $0.92 \leq x \leq 0.98$, and $0 < y \leq 0.08$.

* * * * *